United States Patent
Strasser et al.

(10) Patent No.: US 6,277,313 B1
(45) Date of Patent: Aug. 21, 2001

(54) COMBINATION CONTINUOUS WOVEN-FIBER AND DISCONTINUOUS CERAMIC-FIBER STRUCTURE

(75) Inventors: Thomas Edward Strasser, Corona; William James Marsh, Diamond Bar; Robert Allan Schwindler, Huntington Beach, all of CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/378,843

(22) Filed: Aug. 23, 1999

(51) Int. Cl.⁷ .................................................. D01D 10/10
(52) U.S. Cl. .................. 264/173.1; 264/171.29; 264/87; 264/29.2; 264/510; 264/532
(58) Field of Search ................. 264/171.29, 87, 264/29.2, 510, 532, 555

(56) References Cited

U.S. PATENT DOCUMENTS

| | | | |
|---|---|---|---|
| 4,752,313 | * | 6/1988 | Allaire et al. . |
| 4,810,442 | | 3/1989 | Hilling et al. ........................ 264/60 |
| 5,019,308 | * | 5/1991 | Pratt et al. . |
| 5,488,017 | * | 1/1996 | Szweda et al. . |

* cited by examiner

*Primary Examiner*—Merrick Dixon
(74) *Attorney, Agent, or Firm*—Terry J. Anderson; Karl J. Hoch, Jr.

(57) ABSTRACT

A method of fabricating a ceramic structure as well as a pre-ceramic preimpregnated composite material incorporating a continuous woven fiber and a discontinuous fiber pre-ceramic matrix for subsequent curing and component construction. The method includes preparation of a mixture of discontinuous fibers, fillers, and a pre-ceramic precursor resin where the precursor resin is present in a quantity sufficient to substantially saturate subsequently adjacent woven fiber lengths, and thereafter introducing the mixture to a situs between an upper length of woven fiber and a lower length of woven fiber in alignment with each other while effectuating linear movement of these woven fiber lengths and moving the lengths toward each other for compression and retention in a sandwich configuration to thereby fabricate a pre-ceramic preimpregnated composite material. The material is cut to size in accord with the configuration of a part to be manufactured, formed into a green-state structure, and cured. Finished-product characteristics show a substantially uniform distribution of discontinuous fibers and fillers within the ceramic resin matrix to thereby provide a substantially internally stress-free end product component.

16 Claims, 1 Drawing Sheet

COMBINATION CONTINUOUS WOVEN-FIBER AND DISCONTINUOUS CERAMIC-FIBER STRUCTURE

FIELD OF THE INVENTION

This invention relates in general to a structure of woven fiber and discontinuous fiber immersed in a ceramic matrix, and in particular to the construction of such a structure having a sandwich-configuration with an upper length of woven fiber and a lower length of woven fiber in alignment with each other and having disposed therebetween a substantially uniform distribution of discontinuous fibers within a ceramic resin matrix optionally containing a filler material.

BACKGROUND OF THE INVENTION

Employment of a ceramic based structure for the fabrication of certain components that require the chemical and mechanical properties of such construction is well recognized and non-limitedly exemplified in thin ceramic armor. One such structure that could be beneficial is a cured sandwich configuration comprising an upper length of ceramic-resin impregnated woven fiber and a lower length of ceramic-resin impregnated woven fiber in alignment with each other and having disposed therebetween discontinuous fibers optionally including filler material within a ceramic resin.

However, the present method of fabricating a combination of woven and discontinuous fibers unfortunately yields an inherently stressed end product that is not properly usable in many applications. The introduction of stress is caused by fabrication techniques which include laying a number of ceramic precursor resin-wetted woven fabric plies in a mold, adding a quantity of a mixture of discontinuous fibers, precursor resin, and, as desired, filler powders to the mold, and compressing the mold to form a green-state structure for subsequent ceramic conversion of the matrix by pyrolysis. Because the exposed surface of the fabric is uneven and erratic due to the weave at the bottom of the mold, the mixture containing the discontinuous fibers does not flow smoothly during compression of the mold, thereby resulting in both a nonuniform distribution of the mixture and a clumping of mixture at certain sites while causing degradation of mechanical properties of a finished part. Where clumping occurs, more pressure is placed on the woven fabric to thereby enhance non-uniformity of fiber volume and thickness of the woven section so affected. Second, and again due to non-uniformity of the mixture coupled with high molding pressures, a substantial number of internal stress points are introduced within the mixture in its green state. The stresses can cause warpage of the structure during pyrolytic curing and thereby substantially reduce utility of the structure for component fabrication.

In view of the above prior art construction methodology and resultant end product, it is apparent that a need is present for methodology and consequent end product wherein a continuous woven fiber and a discontinuous ceramic fiber can be coupled in a ceramic matrix to produce an end product having favorable properties for ceramic structural applications. Accordingly, a primary object of the present invention is to provide methodology for fabricating a precursor ceramic preimpregnated composite material comprising a continuous woven fiber and a discontinuous fiber combined with a ceramic precursor resin with or without filler powders for subsequent curing and non-stressed component construction.

Another object of the present invention is to provide methodology for fabricating, as well as an end product of, a woven-fiber and discontinuous-fiber ceramic matrix composite structure for subsequent component construction.

Yet another object of the present invention is to provide a cured woven-fiber and discontinuous-fiber ceramic matrix composite structure having uniform distribution of discontinuous fibers within a ceramic resin.

These and other objects of the present invention will become apparent throughout the description thereof which now follows.

SUMMARY OF THE INVENTION

The present invention is a method of fabricating a ceramic structure as well as a precursor ceramic preimpregnated composite material comprising a continuous woven fiber and a discontinuous fiber combined with a ceramic precursor resin with or without a filler material for subsequent curing and component construction. The method comprises preparation of a mixture of discontinuous fibers with or without filler particles and a ceramic precursor resin where the precursor resin is present in a quantity sufficient to substantially saturate subsequently adjacent woven fiber lengths, and thereafter introducing the mixture to a situs between an upper length of single or multiple-ply woven fiber and a lower length of single or multiple-ply woven fiber in alignment with each other while effectuating linear movement of these woven fiber lengths and moving the lengths toward each other. The opposing upper and lower lengths of woven fiber, with the mixture of discontinuous fibers, with or without a filler material, and a ceramic precursor resin therebetween, are compressed and retained in a sandwich configuration to thereby substantially saturate the woven fiber with ceramic precursor resin and fabricate a preimpregnated composite material for subsequent component fabrication.

The resultant preimpregnated composite material yields a part-fabrication material from which parts requiring ceramic properties can be manufactured. Such a material provides an upper length of pre-ceramic resin impregnated woven fiber and a lower length of pre-ceramic resin impregnated woven fiber in alignment with each other with a substantially uniform distribution therebetween of discontinuous fibers with or without filler material within a pre-ceramic resin. The material is cut to size in accord with the configuration of the part to be manufactured, and then is formed via conventional polymer composite forming techniques non-limitedly exemplified by vacuum form, compression mold, etc. to provide a green-state structure. The structure then is cured by pyrolysis in accord with conventional techniques to produce a finished-product whose characteristics show a substantially uniform distribution of discontinuous fibers and filler material if present within the ceramic matrix to thereby provide a substantially internally stress-free end product.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
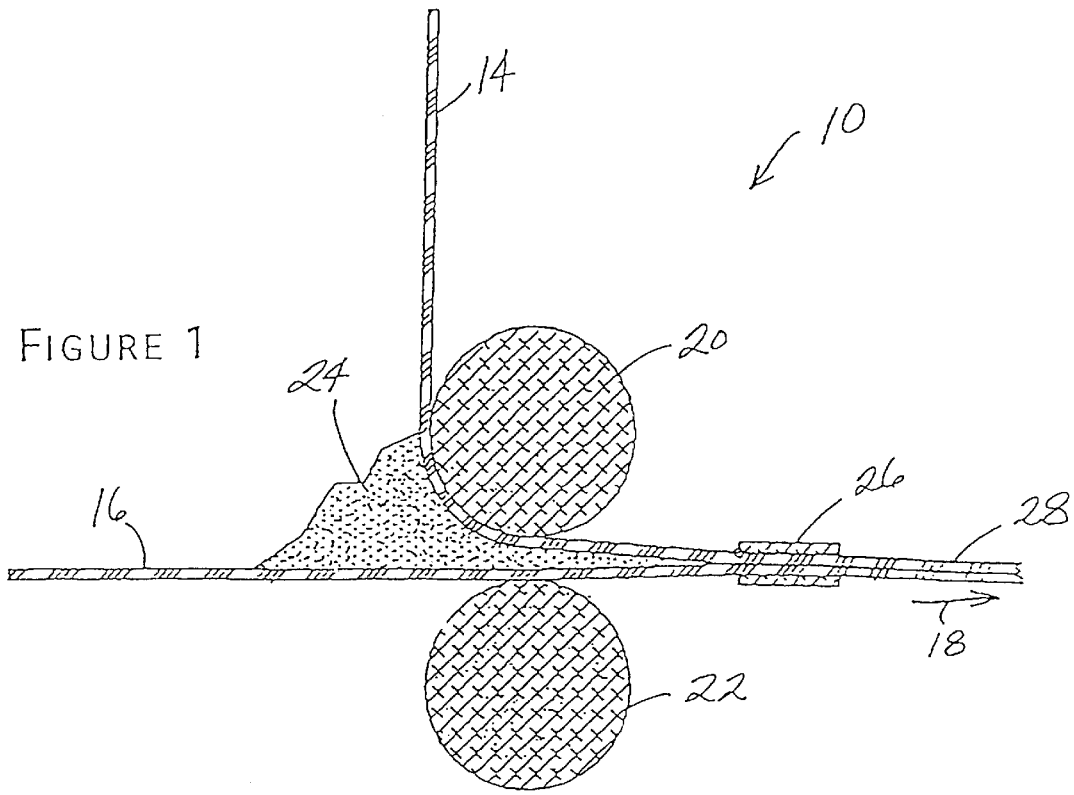
FIG. 1 is a schematic illustration of methodology for fabricating a continuous woven fiber and a discontinuous fiber/filler ceramic precursor resin for subsequent component construction.

Referring to FIG. 1, a schematic mixture-deposition system 10 is shown for fabricating a precursor ceramic preimpregnated composite material comprising a continuous woven fiber and a discontinuous fiber combined with a ceramic precursor resin with or without a filler material for subsequent curing and component construction. In particular, two opposing lengths of woven fiber, which can be single or multiple ply, are arranged to provide an upper length 14 and lower length 16 thereof in alignment with each other and each moving linearly in the direction of the arrow 18. Two oppositely disposed circular rollers 20, 22 are positioned to bring the fiber lengths 14, 16 near each other while a mixture 24 of discontinuous fibers, with or without fillers, and a ceramic precursor resin is introduced for placement between the fiber lengths 14, 16.

The precursor ceramic resin of the mixture 24 is present in a quantity sufficient to substantially saturate the subsequently adjacent woven fiber lengths 14, 16, and preferably, but not necessarily, is polymer derived while being most preferably, but not solely, chosen from the group consisting of BLACKGLAS (Allied Signal Corporation [e.g. resin no. EMRC 493E]), CERASET (DuPont-Lanxide Corporation), SYLRAMIC (Dow-Corning Corporation), and STARFIRE (Starfire Corporation) resins. The discontinuous fibers of the mixture 24 preferably are of a cylindrical rice-like configuration of a length between about 0.125 inch to about 0.25 inch. Most preferably, the woven material and discontinuous fibers are chosen from the group consisting of alumina, Nextel 312, Nextel 440, Nextel 510, Nextel 550, silicon nitride, silicon carbide, HPZ, graphite, carbon, peat, and mixtures thereof. Preferably, the fibers can be coated with an interface material non-limitedly taking the form of at least one 0.1–0.5 micron-thick layer of at least one of carbon, silicon nitride, silicon carbide, silicon carboxide, and boron nitride. If desired, filler material can be included, and can non-limitedly be chosen from the group consisting of alumina, mullite, titania, silicon carbide, graphite, silica, boron nitride, and boron carbide.

As shown in FIG. 1, the opposing woven fiber lengths 14, 16 are moved toward each other while the mixture 24 is introduced between the lengths 14, 16 for final compression and retention in a sandwich configuration by a conventional clamp compression device 26. As noted above, the precursor resin of the mixture 24 is present in a quantity sufficient to substantially saturate the woven fiber lengths 14, 16, and such wetting occurs upon compression and retention of the woven lengths 14, 16. In this manner, a precursor preceramic preimpregnated composite material 28 is produced comprising resin-saturated woven lengths 14, 16 having disposed therebetween the discontinuous fiber/filler resin mixture 24.

Figure 2:
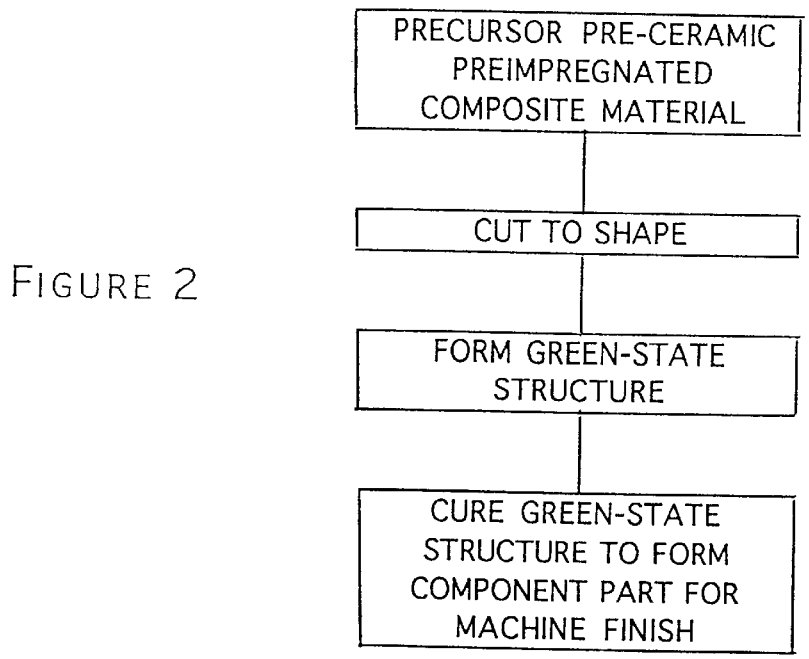
FIG. 2 is a flow diagram outlining methodology for the fabrication of a continuous/discontinuous fiber ceramic matrix finished part.

Referring to FIG. 2, methodology for production of a composite component constructed from the pre-ceramic preimpregnated composite material 28 first includes cutting the material 28 in accord with the configuration of a particular component to be manufactured. This cut piece of material is then formed into a green-state structure which can be accomplished by placing the material into a conventional compression mold form. The green-state structure thereafter is cured in accord with the curing characteristics of the precursor ceramic resin employed (e.g. pyrolysis) to thereby fabricate a woven-fiber and discontinuous-fiber ceramic matrix composite component part. The component part so fabricated has a generally uniform distribution of discontinuous fibers, as well as filler material when included, within a matrix to thereby provide reduced internal stress within the part. Such construction provides greater utility and longevity to the part itself and resultantly, of course, to the article of manufacture within which the part is incorporated.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of fabricating a pre-ceramic preimpregnated composite material comprising a continuous woven fiber and a discontinuous ceramic fiber matrix for subsequent curing and component construction, said method comprising:

a) preparing a mixture of discontinuous fibers and a ceramic precursor resin, said precursor resin present in a quantity sufficient to substantially saturate subsequently adjacent woven fiber lengths;

b) introducing the mixture to a situs between an upper length of woven fiber and a lower length of woven fiber in alignment with each other while effectuating linear movement of said upper and lower lengths and moving said lengths toward each other; and c) compressing and retaining said upper and lower lengths of woven fiber adjacent the mixture there between in a sandwich configuration for forcing an amount of ceramic precursor resin from the mixture to thereby substantially saturate the woven fiber with ceramic precursor resin.

2. A method of fabricating a precursor ceramic structure as claimed in claim 1 wherein the discontinuous fibers are cylindrical of a length between about 0.125 inch to about 0.25 inch.

3. A method as claimed in claim 1 wherein the fibers are chosen from the group consisting of alumina, silicon nitride, silicon carbide, graphite, carbon, peat, and mixtures thereof.

4. A method as claimed in claim 1 wherein the precursor resin is polymer derived.

5. A method as claimed in claim 1 wherein the mixture additionally comprises a filler material.

6. A method as claimed in claim 5 wherein the filler material is chosen from the group consisting of alumina, mullite, titania, silicon carbide, graphite, silica, boron nitride, boron carbide, and mixtures thereof.

7. A method as claimed in claim 1 wherein the fibers are coated.

8. A method as claimed in claim 7 wherein the fibers are coated with a coating chosen from the group consisting of carbon, silicon nitride, silicon carbide, silicon carboxide, and boron nitride.

9. A method of fabricating a woven-fiber and discontinuous-fiber ceramic matrix composite component, said method comprising:

a) preparing a mixture of discontinuous fibers and a ceramic precursor resin, said precursor resin present in a quantity sufficient to substantially saturate subsequently adjacent woven fiber lengths;

b) introducing the mixture between an upper length of woven fiber and a lower length of woven fiber in alignment with each other while effectuating linear movement of said upper and lower lengths and moving said lengths toward each other;

c) compressing and retaining said upper and lower lengths with the mixture there between in a sandwich configuration for forcing an amount of ceramic precursor resin from the mixture to thereby substantially saturate the woven fiber with ceramic precursor resin and fabricate a pre-ceramic preimpregnated composite material;

d) cutting the pre-ceramic preimpregnated composite material according to a pattern of the component;

e) forming the cut pre-ceramic preimpregnated composite material into a green-state structure: and f) curing the green-state structure to thereby produce a part.

10. A method as claimed in claim 9 wherein the discontinuous fibers are cylindrical of a length between about 0.125 inch to about 0.25 inch.

11. A method as claimed in claim 9 wherein the fibers are chosen from the group consisting of alumina, silicon nitride, silicon carbide, graphite, carbon, peat, and mixtures thereof.

12. A method as claimed in claim 9 wherein the precursor resin is polymer derived.

13. A method as claimed in claim 9 wherein the mixture additionally comprises a filler material.

14. A method as claimed in claim 13 wherein the filler material is chosen from the group consisting of alumina, mullite, titania, silicon carbide, graphite, silica, boron nitride, boron carbide, and mixtures thereof.

15. A method as claimed in claim 9 wherein the fibers are coated.

16. A method as claimed in claim 15 wherein the fibers are coated with a coating chosen from the group consisting of carbon, silicon nitride, silicon carbide, silicon carboxide, and boron nitride.

* * * * *